(12) United States Patent
Algüera et al.

(10) Patent No.: US 7,140,632 B2
(45) Date of Patent: Nov. 28, 2006

(54) DEVICE FOR INDICATING THE LOCKING STATE OF A FIFTH WHEEL COUPLING AND SENSOR ARRANGEMENT

(75) Inventors: Jose Algüera, Aschaffenburg (DE); Michael Eiermann, Pfungstadt (DE); Achim Krüger, Gernsheim (DE)

(73) Assignee: Jost-Werker GmbH & Co. KG, Frankfurt am Main (DE)

( * ) Notice: Subject to any disclaimer, the term of this patent is extended or adjusted under 35 U.S.C. 154(b) by 0 days.

(21) Appl. No.: 11/043,869

(22) Filed: Jan. 26, 2005

(65) Prior Publication Data

US 2005/0121921 A1  Jun. 9, 2005

Related U.S. Application Data

(62) Division of application No. 10/654,772, filed on Sep. 4, 2003, now Pat. No. 6,866,283.

(30) Foreign Application Priority Data

Sep. 6, 2002 (DE) ................................ 102 41 904

(51) Int. Cl.
*G08B 21/00* (2006.01)

(52) U.S. Cl. ...................................... 280/433; 340/431

(58) Field of Classification Search ................ 280/432, 280/433, 435, 508; 340/431
See application file for complete search history.

(56) References Cited

U.S. PATENT DOCUMENTS

| 3,585,899 | A | 6/1971 | Jaras |
| 4,127,856 | A | 11/1978 | Bickel |
| 4,413,943 | A | 11/1983 | Liljestrom |
| 5,022,714 | A | 6/1991 | Breen |
| 5,029,948 | A | 7/1991 | Breen et al. |
| 5,033,798 | A | 7/1991 | Breen |
| 5,152,544 | A | 10/1992 | Dierker et al. |
| 5,477,207 | A | 12/1995 | Frame et al. |
| 5,617,072 | A * | 4/1997 | McNeal ..................... 280/441 |
| 5,861,802 | A | 1/1999 | Hungerink et al. |
| 6,100,794 | A * | 8/2000 | Hillier ........................ 280/433 |
| 6,587,041 | B1 | 7/2003 | Brown, Jr. |

FOREIGN PATENT DOCUMENTS

DE    198 20 139    11/1999

\* cited by examiner

*Primary Examiner*—Kevin Hurley
(74) *Attorney, Agent, or Firm*—Hudak, Shunk & Farine Co., LPA

(57) ABSTRACT

A device is described for indicating the locking state of a fifth wheel coupling and an arrangement of a first and a second sensor. According to the prior art, the first sensor is arranged on the underside of the locking latch and monitors the position of the kingpin in relation to the locking latch. A second sensor that is used is an inductive proximity switch that monitors a safety mechanism against loosening. In practice, this type of positioning of the first sensor has led to damage of the locking latch and the first sensor, while the signals of the second sensor were often false signals. Thus, the object of the invention is to provide a device for indicating the locking state, which maximizes operational availability and minimizes false signals. A further object of the invention is to optimize the arrangement of the first and the second sensor. These objects are attained by arranging the first sensor detecting the kingpin in the area of the locating hole and configuring the second sensor as a magnetically sensitive sensor that interacts with a magnet mounted on the operating lever. The two sensors are based on different mechanisms of action.

14 Claims, 2 Drawing Sheets

DEVICE FOR INDICATING THE LOCKING STATE OF A FIFTH WHEEL COUPLING AND SENSOR ARRANGEMENT

CROSS REFERENCE

This is a division of application Ser. No. 10/654,772, filed on Sep. 4, 2003, now U.S. Pat. No. 6,866,283 of Jose Alguera et al. for DEVICE FOR INDICATING THE LOCKING STATE OF A FIFTH WEEL COUPLING AND SENSOR ARRANGEMENT.

FIELD OF THE INVENTION

The invention relates to a device for indicating the locking state of a fifth wheel coupling, comprising an evaluation unit to which a first and a second sensor are connected and a display unit which is connected with the evaluation unit. The device further relates to an arrangement of a first and a second sensor on a fifth wheel with which a kingpin in a locked state is engaged in a positive locking manner.

BACKGROUND OF THE INVENTION

DE 198 20 139 A1 represents a generic prior art in this connection. This document describes a method and an arrangement for monitoring the proper locking and securing of a fifth wheel equipped with a locking mechanism and a safety mechanism. A first sensor is provided for monitoring the state of the locking mechanism and a second sensor for directly or indirectly monitoring the state of the safety mechanism. The first sensor is an inductive proximity switch and is intended to be mounted on the underside of the locking latch and to monitor the position of the kingpin in relation to the locking latch. If the kingpin is driven in too high, it rises above the locking latch, which increases the risk of false detections. In practice, however, such a positioning of the first sensor has proven to be a drawback because the locking latch must first be locked before the sensor can detect the position of the king pin in relation to the locking latch. An incorrect positioning of the kingpin led to increased wear and damage to the locking latch and the first sensor mounted thereon, since the locking latch, even during travel, is subject to substantial impact loading, which is also transmitted to the first sensor. Another weak point is the flexibly installed cables. The second sensor is likewise an inductive proximity switch, which monitors a locking mechanism that secures the safety mechanism against loosening. For this purpose, a tongue of the locking mechanism is monitored, which is within the detection range of the sensor only as long as the locking mechanism stays in a locked position in which the operating lever is secured by a cam. The essential drawback of the sensor arrangement of this second sensor is that there are frequent false alarms because the major part of the fifth wheel is made of steel, and actuating the operating lever changes the position of a plurality of other components in relation to the second sensor, which then trigger a false signal.

SUMMARY OF THE INVENTION

Thus, the object of the invention is to provide a device for indicating the locked state that maximizes operational availability and minimizes false signals.

A further object is to optimize the arrangement of the first and the second sensor.

These objects are attained by a device for indicating the locking state of a fifth wheel coupling, comprising a locating hole for receiving a kingpin, an operating lever which in a locked position can be fixed in a holding position, and an evaluation unit to which a first and a second sensor are connected as well as a display unit connected to the evaluation unit. According to the invention, the first sensor is arranged in the area of the locating hole and detects the kingpin, while the second sensor is a magnetically sensitive sensor, which interacts with a magnet mounted to the operating lever, such that the two sensors are based on different mechanisms of action.

Basing the two sensors on different mechanisms of action, e.g. a proximity switch and a magnetically sensitive sensor, minimizes the possible mutual influences as well as the risks of failure.

With respect to the coupling states that can be indicated on the display unit, two states occur in normal operation. In a first state, the first sensor detects a kingpin and the second sensor confirms a locked position of the operating lever.

In a second state, the first sensor does not detect a kingpin and the second sensor signals an open position of the operating lever, i.e. the tractor is currently driving without a semi-trailer with the fifth wheel ready for coupling.

If the operating lever is in its open position and the kingpin is present or the operating lever is in its closed position and the kingpin is not present, the display unit signals an error message to the driver.

Positioning the first sensor in the locating hole of the fifth wheel, preferably in an area opposite the locking latch, places the first sensor in an area that is subject to little wear. During the coupling process, the tractor backs up against the stationary semi-trailer, which for coupling with the fifth wheel of the tractor is provided with a kingpin having an upper collar, a middle section with a smaller diameter for engaging with the locking latch of the fifth wheel and a lower collar. The first sensor can now sense, for example, the lower collar of the kingpin, which is already in the locating hole without the locking latch being closed. If the kingpin is incorrectly positioned, the driver can first make corrections while the fifth wheel is in its open position until the first sensor detects that the kingpin is horizontally and vertically in its correct position.

The second sensor used is a magnetically sensitive sensor. Suitable are, for example, reed sensors or Hall-effect sensors, which interact with a magnet located at a corresponding point of the operating lever. The magnet preferably moves in the direction of the fixed second sensor. Since no other magnets are normally present on the fifth wheel, false signals are minimized.

The display unit is preferably arranged in a driver's cab of a tractor of a semi-trailer. Based on such an arrangement of the display unit in the driver's cab, the driver receives information on the position of the kingpin in relation to the fifth wheel or the position of the operating lever in an area visible from the driver's seat. As a result, the driver does not need to leave the cab during coupling and uncoupling to get this information. Furthermore, the position of the operating lever is continuously displayed for the driver during travel and, in particular, after prolonged breaks.

The further object is attained, firstly, by a first sensor mounted to a fifth wheel with which a kingpin in a locked state is engaged in a positive locking manner. A coupling plate for receiving the king pin has a complementary locating hole, and the kingpin has an upper collar, a middle section with a reduced diameter for engaging with a locking latch and a lower collar. According to the invention, the first sensor is disposed in the area of the locating hole below the coupling plate and detects the kingpin. The essential advantages are fixed cables that are not subject to continuous motion, reduced impact loading of the sensor and a reduced risk of false detections due to fixed installation.

Advantageously, the first sensor detects the lower collar of the kingpin. In the first place, the lower collar, unlike, for example, the middle section with the reduced diameter, is subject to little wear, so that the distance between the sensor and the lower collar remains constant even after a prolonged operating time. A further advantage of detecting the lower collar of the kingpin is that the first sensor can be fixedly mounted in a protected area underneath the coupling plate of the fifth wheel.

Advantageously, the first sensor lies radially opposite of the lower collar of the engaged kingpin. Thus, an incorrect positioning or the absence of the kingpin can be detected in all three spatial directions.

Preferably, the first sensor is disposed in an area opposite the locking latch. During normal travel, the kingpin contacts the locking latch with its middle section with the reduced diameter, such that wear occurs in both components after a prolonged time, and they may have to be replaced. The area of the locating hole opposite the locking latch contacts the kingpin only when the tractor backs up and is therefore subject to little wear. The locking latch can therefore be replaced in the same manner as before, without the first sensor having to be removed and subsequently reinstalled and recalibrated in a time-consuming process. A further advantage is that the sensor can detect the kingpin without prior actuation of the locking latch. As a result, if the kingpin is incorrectly positioned, the fifth wheel coupling and, in particular, the locking latch are not actuated and are consequently protected from damage.

Advantageously, the first sensor can be a proximity switch. Proximity switches are defined as only inductively operating sensors. Such proximity switches are inexpensive, technically mature and can interact with ordinary components made of steel, such that a conventional kingpin may be used.

The additional object is further attained by an arrangement of a second sensor on a fifth wheel receiving a kingpin, on which a locking latch mounted underneath a coupling plate rotatably fixes the king pin. The locking latch can be brought into an open position or a locked position via a locking mechanism. This locking mechanism comprises an operating lever, which in the locked position can be fixed in a holding position. The second sensor is mounted on the underside of the coupling plate to detect the holding position of the operating lever. According to the invention, this second sensor is a magnetically sensitive sensor that interacts with a magnet attached to the operating lever.

In contrast to the aforementioned proximity switches, magnetically sensitive sensors are defined as reed sensors or Hall-effect sensors. Such sensors respond to the presence of a magnetic field and are therefore comparatively insensitive to adjacent steel components that change their position.

In a special embodiment, the operating lever can comprise a pivoted lever and a handle lever laterally displaceable thereon and securing the operating lever. The magnet is arranged on the handle lever.

Such an embodiment makes it possible to operate the fifth wheel—and consequently to switch between an open and closed position—with one hand. In this case, the pivoted lever is secured mechanically in the same manner as before, e.g. with a notch-like recess that engages with a wall or a cam of the fifth wheel. To be able to swing out the pivoted lever and thereby to release the notch-like recess from the wall, the handle lever must be laterally displaced relative to the pivoted lever, such that a magnet disposed on the handle lever changes its position in relation to the second sensor and thereby influences the magnetically sensitive sensor.

Preferably, the magnet is mounted on the coupling-side end of the operating lever, particularly preferably on the coupling-side end of the handle lever. This arrangement makes it possible to mount the second sensor in a protected location within the fifth wheel. Mounting the sensor to the above-described embodiment of a one-handed actuation of the fifth wheel furthermore has the advantage that the second sensor simultaneously detects the lever mechanism and thus also the pivoted lever, such that any defect in the area of the pivoted lever is also detected.

Advantageously, the second sensor is fixed in relation to the coupling plate. As a result, the sensor itself, its connecting cables and soldered connections are less subject to mechanical loading.

BRIEF DESCRIPTION OF THE DRAWINGS

The invention will now be described in greater detail, by way of example, with reference to two drawing figures in which.

DETAILED DESCRIPTION OF THE INVENTION

Figure 1:
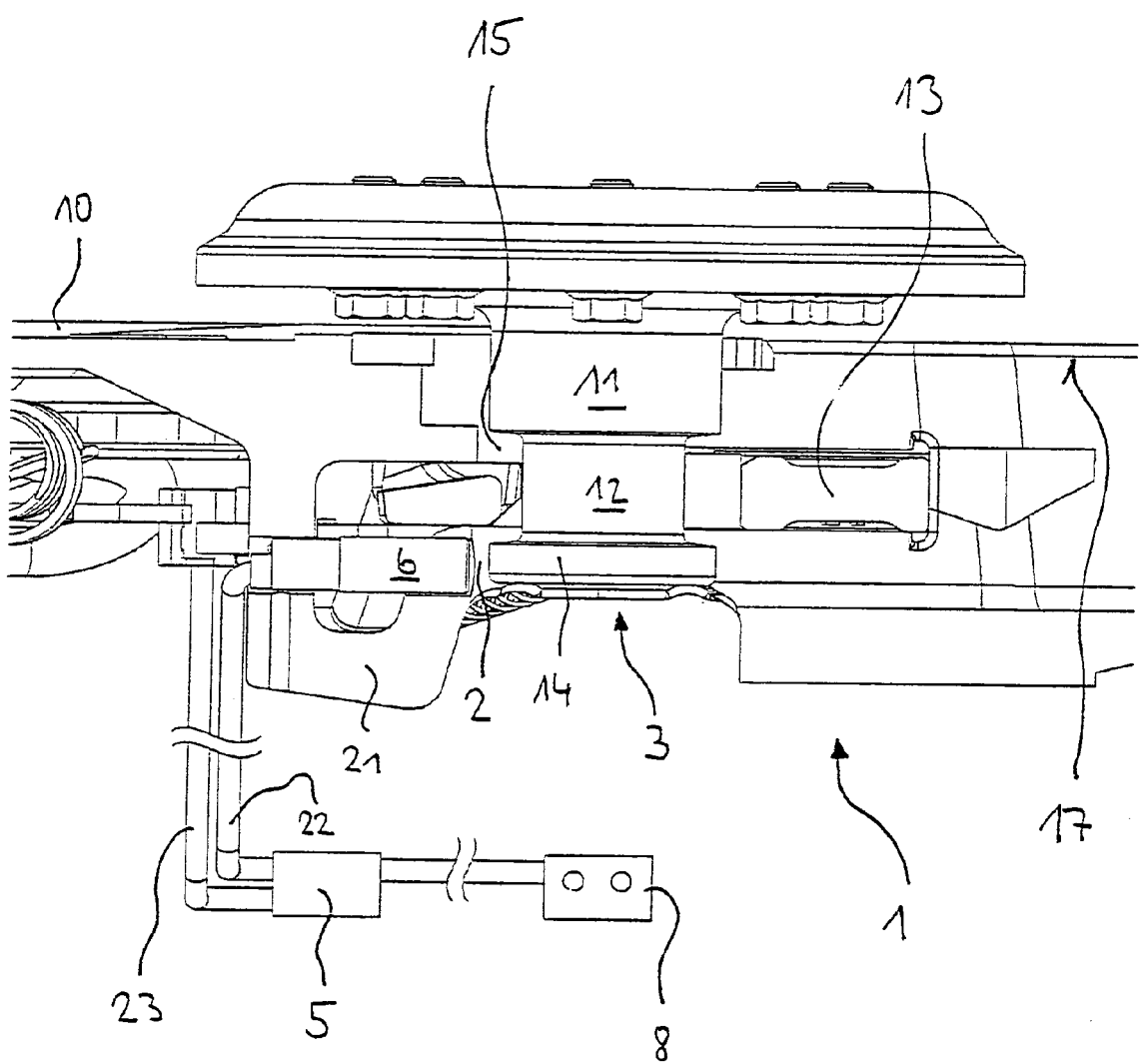
FIG. 1 is a longitudinal section of a fifth wheel with a kingpin and a first sensor.
Figure 2:
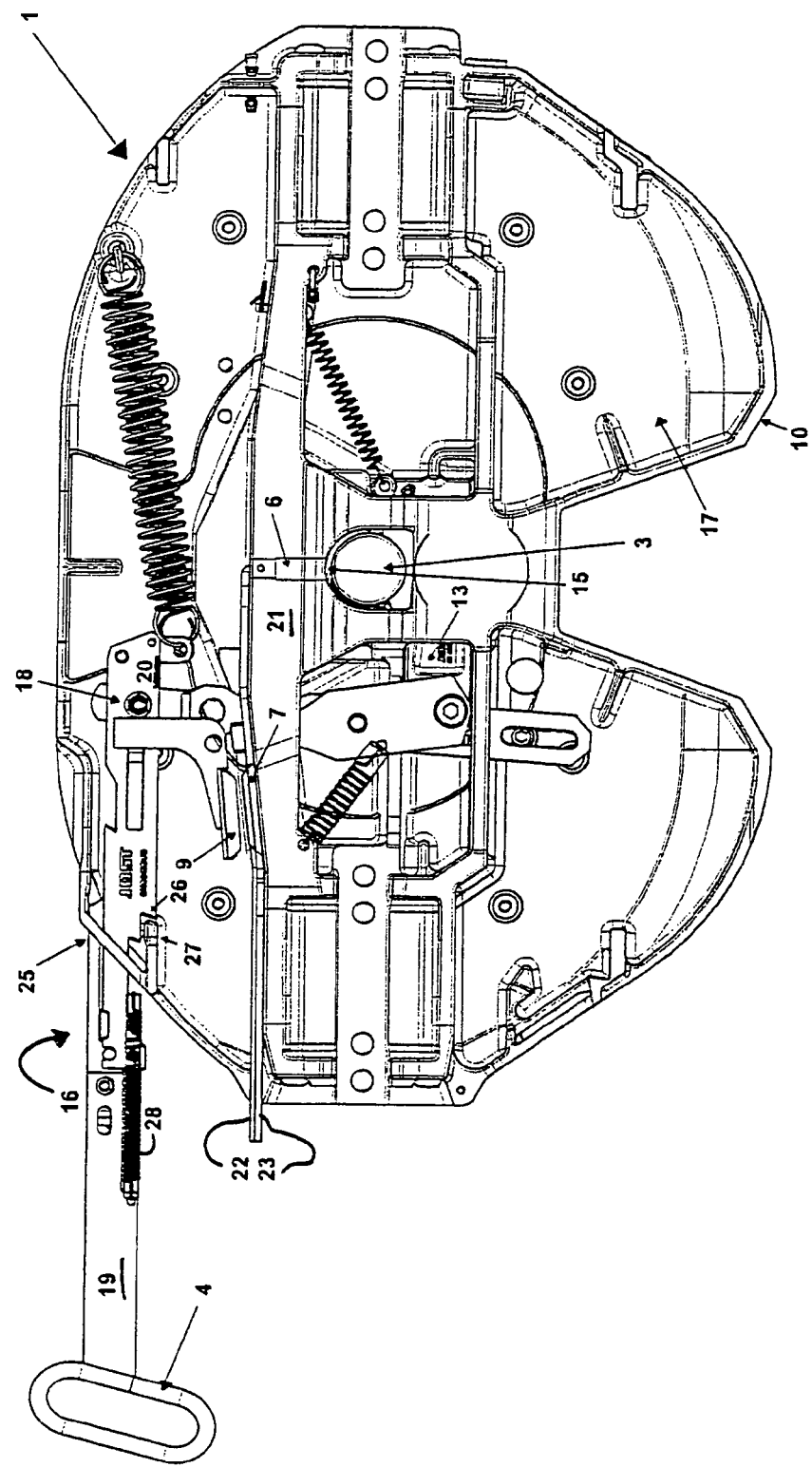
FIG. 2 is a bottom view of a fifth wheel with a first and a second sensor.

FIG. 1 is a longitudinal section of the central area of a fifth wheel 1 with a kingpin 3 arranged in a locating hole 2 (cf. FIG. 2). The kingpin 3 essentially has an upper collar 11, a middle section 12 with a reduced diameter below that and a lower collar 14. For a positive locking engagement of the kingpin 3 with the fifth wheel 1, a locking latch 13 pivotably supported on the coupling plate 10 engages with the middle section 12 of the kingpin 3.

The first sensor 6 is disposed radially to the engaged kingpin 3 in a reinforcing rib 21 where it is protected. It contactlessly detects the lower collar 14 of the kingpin 3 and sends an electrical signal via the first sensor line 22 to the evaluation unit 5. In addition to this first sensor line 22, a second sensor line 23 of the second sensor 7 (see FIG. 2) is connected to the evaluation unit 5. A data line extends from the evaluation units to e.g. the driver's cab of a tractor (neither of which is shown) where it is connected to a display unit 8.

FIG. 2 is a bottom view that shows the underside 17 of the coupling plate 10 and a locking mechanism 16 engaging therewith. The locking lever 13 is in its locked position if a kingpin 3 is present. The first sensor 6 is accommodated in the reinforcing rib 21 on the locating hole 2 in an area 15 opposite the locking latch 13.

The locking latch 13 is moved between an open position and the depicted closed position via a locking mechanism 16. This motion is triggered via the operating lever 4, which protrudes from the fifth wheel 1, is constructed in two parts and can be actuated with one hand. Specifically, the operating lever 4 comprises the pivoted lever 18 and the handle lever 19, which is mounted thereto so as to be laterally displaceable. In the depicted extended position of the handle lever 19, there is sufficient room in the lever opening 25 so that the pivoted lever 18 can likewise be laterally displaced and fixed by hooking the projection 26 behind the cam 27. When the handle lever 19 is released, it is pulled in the direction of the coupling-side end 20 of the operating lever 4 by the handle lever tension spring 28 and fills the lever opening 25 almost completely, so that the operating lever 4 is additionally secured.

The above-described safety device is now monitored by a magnet 9 arranged on the coupling-side end 20 of the handle lever 19, which interacts with a second sensor 7 mounted on the underside 17 of the coupling plate 10. In case of a material fracture in components of the operating lever 4 or the cam 27, the handle lever 19 could migrate outwardly and the locking latch 13 could open as a result of vibrations. In this case, the distance between the magnet 9 and the second sensor 7 would increase as the handle lever 19 migrates, which would be signaled to the driver via the display unit 8.

LIST OF REFERENCE NUMERALS 1 fifth wheel
2 locating hole
3 kingpin
4 operating lever
5 evaluation unit
6 first sensor
7 second sensor
8 display unit
9 magnet
10 coupling plate
11 upper collar
12 middle section
13 locking latch
14 lower collar
15 area opposite the locking latch
16 locking mechanism
17 underside of coupling plate
18 pivoted lever
19 handle lever
20 coupling-side end
21 reinforcing rib
22 first sensor line
23 second sensor line
25 lever opening
26 projection
27 cam
28 handle lever tension spring

The invention claimed is:

1. An apparatus, comprising:
    an arrangement of a sensor on a fifth wheel with which a kingpin in a locked state can be engaged in a positive-locking manner, in which a coupling plate has a complementary locating hole to receive the kingpin, and
    the kingpin has an upper collar, a middle section with a reduced diameter for engaging with a locking latch and a lower collar, wherein the sensor is arranged in the area of the locating hole below the coupling plate, wherein said sensor monitors the locating hole and is adapted to detect the kingpin in the locating hole and signals whether the kingpin is present or absent from the locating hole.

2. The apparatus as claimed in claim 1, wherein the sensor detects the lower collar of the kingpin.

3. The apparatus as claimed in claim 1, wherein the sensor is radially opposite the lower collar of the engaged kingpin.

4. The apparatus as claimed in claim 1, wherein the sensor is arranged in an area opposite the locking latch across the locating hole.

5. The apparatus as claimed in claim 1, wherein the sensor is a proximity switch.

6. The apparatus as claimed in claim 2, wherein the sensor is radially opposite the lower collar of the engaged kingpin.

7. The apparatus as claimed in claim 6, wherein the sensor is arranged in an area opposite the locking latch.

8. The apparatus as claimed in claim 7, wherein the sensor is a proximity switch.

9. An apparatus, comprising: an arrangement of a sensor on a fifth wheel adapted to receive a kingpin, in which
    a locking latch arranged underneath a coupling plate rotatably fixes the kingpin,
    the locking latch can be brought into an open position or a closed position via a locking mechanism,
    the locking mechanism comprises an operating lever, which in the locked position can be fixed in a holding position, and
    the sensor is mounted on the underside of the coupling plate for detecting the holding position of the operating lever, wherein the sensor is a magnetically sensitive sensor, which interacts with a magnet mounted on the operating lever.

10. The apparatus as claimed in claim 9, in which the operating lever comprises a pivoted lever and a handle lever laterally displaceable thereon and securing the operating lever, wherein the magnet is arranged on the handle lever.

11. The apparatus as claimed in claim 9, wherein the magnet is mounted on the coupling-side end of the operating lever.

12. The apparatus as claimed in claim 9, wherein the sensor is fixed in relation to the coupling plate.

13. The apparatus as claimed in claim 10, wherein the magnet is mounted on the coupling-side end of the operating lever.

14. The apparatus as claimed in claim 13, wherein the sensor is fixed in relation to the coupling plate.

* * * * *